May 3, 1966            C. A. MILLS            3,249,741
APPARATUS FOR BAKING BY DIFFERENTIAL WAVE LENGTHS
Filed May 20, 1963
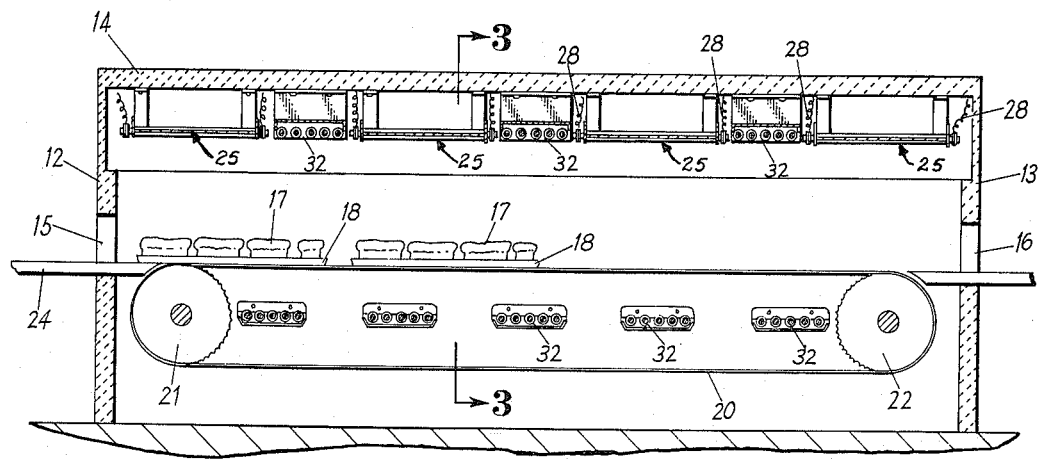
Fig.1
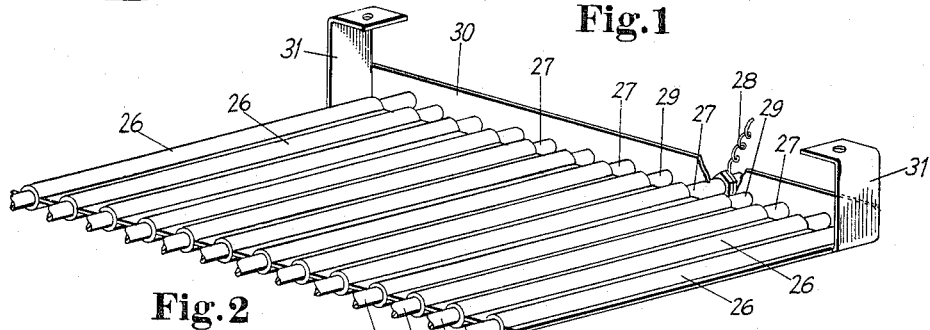
Fig.2
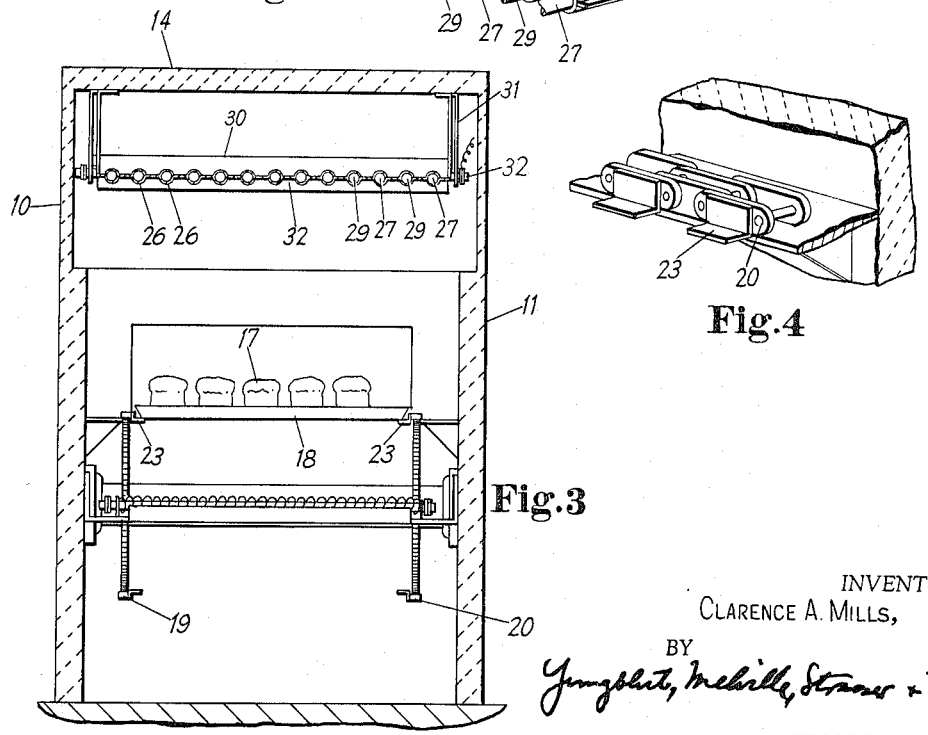
Fig.3
Fig.4
INVENTOR.
CLARENCE A. MILLS,
BY
ATTORNEYS.

United States Patent Office 3,249,741
Patented May 3, 1966

3,249,741
APPARATUS FOR BAKING BY DIFFERENTIAL
WAVE LENGTHS
Clarence A. Mills, Cincinnati, Ohio, assignor to Reflectotherm, Inc., Cincinnati, Ohio, a corporation of Ohio
Filed May 20, 1963, Ser. No. 281,487
4 Claims. (Cl. 219—388)

This invention relates to a method and apparatus for the roasting and baking of food products, and more particularly to the utilization of differential wave lengths to simultaneously accomplish a complete center bake within the food product along with a desirable amount and depth of surface browning.

In the baking of food products according to conventional practice in hot air or short wave length infrared ovens, the baking heat is essentially deposited on the surface layers of the product to be baked, and can reach the deeper center portions of that product only by conduction. Since organic materials are as a general rule rather poor heat conductors, the conventional baking process requires a relatively long baking time in order to bring the center of the product up to the desired temperature which will accomplish the complete center bake.

Attempts to speed up the baking process by the use of hotter air or a hotter short wave length infrared source are limited by the amount of heating the surface of the product can tolerate without undesirable results. For example, in the case of cakes, cookies, and the like, surface temperatures above about 350° F. will cause undesired and progressive charring; temperatures below 350° F. cause a caramelization and browning of the surface layers. For these same products, a center temperature in the range of 200° to 210° F. are needed for a proper bake, and the total bake time is determined by the amount of time it takes to raise the center of the product to that temperature, while maintaining the surface of the product at a temperature below 350° F.

It is now widely known that remarkable results can be accomplished by utilizing ultra-long wave length infrared radiation for the direct heating of the product center. Such techniques have successfully been used in the cooking of meats and the like, and have reduced the required cooking time by as much as about 50%. However, in the case of a process for baking cakes, cookies, and the like, such techniques have been unacceptable.

It is believed that these difficulties are encountered at least in part because of the fact that while the center of the product is completely baked, and while in fact the product is cooked throughout, it will lack the caramelization or surface browning which is relatively more important in the case of bakery goods and the like.

It is therefore a primary object of this invention to provide an apparatus and method for the baking and roasting of food products, which will accomplish a complete center bake in a minimum of time, and simultaneously will give a desired amount and depth of surface browning.

Another object of this invention is the provision of a simplified oven construction, and a simplified means for control of the oven.

These objects, along with others which will become apparent from a study of the following specifications, are accomplished by that certain construction and arrangement of parts set forth in more detail hereinafter. Reference will be made from time to time to the accompanying drawings, in which:

FIGURE 1 is a cross sectional view through the oven of this invention;

FIGURE 2 is a perspective view showing the preferred form of the source of ultra-long wave length infrared radiation;

FIGURE 3 is a cross sectional view along the line 3—3 of FIGURE 1; and

FIGURE 4 is a perspective view showing the preferred form of the conveyor of this invention.

Without intending to be bound by theory, it is believed that all heat originates in radiant form at wave lengths which are inversely proportional to the temperature of the emitting source. That is, the higher the temperature, the shorter the wave length. It is also believed that the transparency of organic materials such as bakery products to radiant heat increases in direct relationship to the wave lengths of the radiation. In other words, the longer the wave length, the greater its penetration into an organic mass before the radiant energy is transformed into sensible heat.

For the sake of definition, the term "ultra-long wave length radiation," as used hereinafter, will refer to wave lengths in the range of 30 to 400 microns; and the term "short wave length radiation," will refer to wave lengths in the range of 0.8 to 30 microns.

In simplest terms, the apparatus of this invention includes an oven having walls of an insulative material. Within the oven is provided a means for supporting the product to be baked, such that substantially the entire surface of the product is exposed to the radiation sources described hereinafter. Within the oven and above the product being baked is provided a source of ultra-long wave length infrared radiation; and suitable sources of short wave length infrared radiation are provided both above and below the product being baked. By utilizing separate and independent controls for the source of ultra-long wave length radiation and for the sources of short wave length radiation, the degree of surface browning with respect to the total bake time can be closely controlled. It will be course be understood that while the above mentioned sources of radiation are independently controlled, these various controls must be correlated to the degree necessary to give the desired results.

Referring now to the drawings, the apparatus of this invention will be described in more detail. The various components are located within an oven housing including side walls 10 and 11, end walls 12 and 13, and the roof 14. It will of course be understood that the oven housing will be formed of any suitable insulative material. It will further be understood that the end walls 12 and 13 are provided with suitable openings 15 and 16 serving as an entrance and exit respectively for the products to be baked. If desired, these openings may be provided with a hinged closure member of the like, as is well known in the art.

In the embodiment shown, the products being baked are loaves of bread 17 which are shown as being carried in aluminum bake pans 18. The means for supporting the articles being baked within the oven comprise simply the sprocket chains 19 and 20, driven by the wheels 21 and 22. Each of the chains 19 and 20 is provided with a plurality of inwardly extending brackets 23, and the chains are so spaced apart that the inner-ends of the brackets 23 will engage and support the bake pans 18. It should now be apparent that in this embodiment of the invention, the product to be baked is placed in an aluminum bake pan 18; this pan is placed on the shelf 24, and slipped through the opening 15 until the edges of the bake pan are engaged by the brackets 23 on the sprocket chains 19 and 20.

Within the oven, and in the area above the product to be baked, are provided a plurality of sources of ultralong wave length infrared radiation indicated generally at 25. As shown in perspective in FIGURE 2, the sources of ultra-long wave length infrared radiation are preferably of the tube-in-strip type, wherein the plate is formed with a series of parallel tubes 26. Each alternate tube has a Calrod 27 having suitable wire connections 28 at each end. Extending through the tubes between those provided with Calrods are the rods 29, supported at their ends by the bracket 30 to provide a rigid assembly and take the weight off the Calrods. The ends of the bracket 30 are secured to the mounting members 31, which in turn are fastened in any suitable manner to the roof of the oven 14.

As set forth elsewhere in the art, when plates of this type are coated with amorphous carbon black, and are heated to a temperature in the range of 400° to 550° F., approximately 15% of their outgoing radiant energy will be in the ultra-long wave length range of 200 to 400 microns, while the remaining 85% of the total infrared radiation follows the usual Planckian distribution.

The oven of this invention is also provided with sources of short wave length infrared radiation located both above and below the product to be baked. In the embodiment shown, these sources of radiation comprise a plurality of sets of resistance heating elements 32, which when heated to high temperatures, glow and emit infrared radiation of the short range set forth hereinabove.

The amount and depth of the surface browning resulting from the short wave length infrared radiation is readily controlled through adjustment of the temperature of the emitting source. As noted before, wave lengths and depths of penetration through the product's surface layers are inversely related to the temperature of the emitting source; the hotter the emitting source, the shorter the wave length, and the thinner the layer of surface browning or crusting.

As mentioned before, this embodiment of the invention contemplates that the product being baked is carried in a metallic bake pan. Since it is well known that metallic substances are highly reflective to infrared radiation, the outer surfaces of such bake pans must be carbon blacked.

In the preferred embodiment of this invention, no air movement, beyond a slight natural stack ventilation, is either needed or used.

Numerous modifications in this invention will become apparent to the skilled worker in the art. For example, if the product to be baked can be carried in non-metallic containers or on a conveyor which is transparent to ultra-long wave length infrared radiation, it then becomes practical to utilize a source of such ultra-long wave length infrared radiation both above and below the product to be baked. This particular phase of the process and apparatus has particular utility in the roasting of nuts, seeds, and the like.

It will also be apparent that while electrical heating of the carbon black plates 25 is preferred at the present time, it is possible to use any other heating medium which will satisfactorily maintain the plates at a temperature in the specified ranges.

Therefore, the description of a specific embodiment is to be construed as exemplary only, and no limitations are intended except insofar as set forth in the following claims.

What is claimed as new, and what it is desired to secure by Letters Patent is:

1. An apparatus for baking by differential wave lengths comprising an oven having enclosing walls with at least one opening for the passage of products to be baked; means within said oven for supporting said product to be baked; at least one source of ultra-long wave length infrared radiation above said means for supporting said product to be baked, said source of ultra-long wave length infrared radiation comprising a heating plate, the outer surface of said plate being coated with amorphous carbon black; means for heating said plate to a temperature in the range of 400° to 550° F.; and at least one source of short wave length infrared radiation above and below said means for supporting said product to be baked.

2. The apparatus claimed in claim 1 wherein each of said sources of short wave length infrared radiation comprises a high temperature glowing element, and including independent means for controlling the temperature of said element, whereby the amount and depth of surface browning of said product may be regulated.

3. The apparatus claimed in claim 2 wherein said means within said oven for supporting said product to be baked comprises a metallic bake pan, the outer surfaces of said pan being coated with amorphous carbon black, said wherein said supporting means comprises a plurality of tabs adapted to engage the side edges of said baking pan.

4. The apparatus claimed in claim 3 wherein said supporting means is movable through said oven, and including means for controlling the speed of said means through said oven.

References Cited by the Examiner

UNITED STATES PATENTS

| | | |
|---|---|---|
| 2,146,427 | 2/1939 | Hawkins. |
| 2,340,354 | 2/1944 | Wells _____ 107—54.2 |
| 2,454,370 | 11/1948 | Beaubien _____ 219—411 X |
| 2,504,110 | 4/1950 | Davis et al. _____ 219—354 X |
| 2,824,943 | 2/1958 | Laughlin. |
| 2,924,695 | 2/1960 | Atkeson _____ 219—388 X |
| 3,003,409 | 10/1961 | Mills _____ 219—411 X |
| 3,119,354 | 1/1964 | Gawlitza et al. ____ 107—338 X |

RICHARD M. WOOD, *Primary Examiner.*

CHARLES A. WILLMUTH, *Examiner.*